United States Patent Office 3,378,379
Patented Apr. 16, 1968

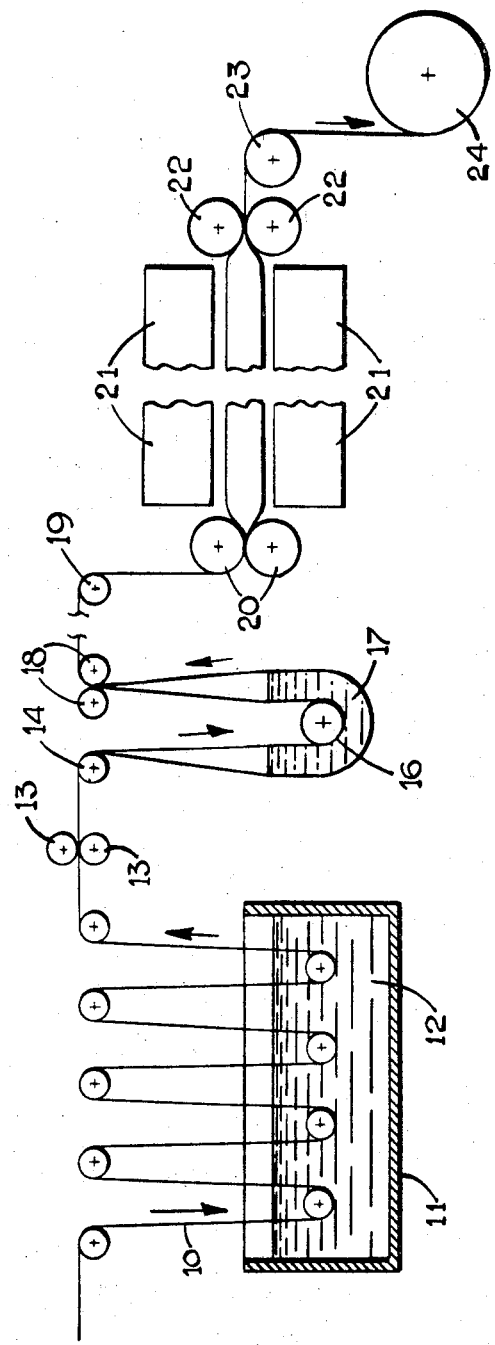

3,378,379
FOOD CASING AND METHOD OF PRODUCING SAME
Edward A. Shiner, Herman S. Chiu, and Frank T. Kambara, Chicago, Ill., assignors to Union Carbide Corporation, a corporation of New York
Continuation-in-part of application Ser. No. 281,926, May 21, 1963. This application July 8, 1966, Ser. No. 563,773
22 Claims. (Cl. 99—176)

ABSTRACT OF THE DISCLOSURE

Enhancing the ability of a dry sausage casing to adhere to a meat mass encased, processed and dried therein and improving the extensibility of fibrous webs utilized in the manufacture of fibrous food casings can both be accomplished by subjecting the casing and the fibrous web to treatment with a thermosetting resin acting as a bonding agent.

---

This application is a continuation-in-part application of our earlier copending application Ser. No. 281,926 filed May 21, 1963, now abandoned.

The present invention relates to food casings and methods for preparing the same. More particularly, the present invention relates to methods of preparing cellulosic sausage casings which will adhere to a meat mass encased, processed and dried therein and the casings produced by said method. The present invention also relates to fibrous webs utilized in the production of food casings and methods for the preparation of these fibrous webs. Even more particularly, the present invention relates to methods of preparing fibrous webs utilized in the production of fibrous food casings which fibrous webs exhibit improved extensibility from which fibrous food casings having greater dimensional uniformity can be obtained.

The scope and purpose of the present invention will become more clear by first generally describing the problems sought to be overcome.

Food casings, which are employed to obtain dried sausage products, are commonly referred to as dry sausage casings by those skilled in the art. These dry sausage casings should preferably exhibit an affinity for the meat mass encased therein as the encased meat mass shrinks during subsequent processing and drying. Unless the dry sausage casing adheres to the meat mass during processing and drying, a dry sausage product is obtained which is unsightly and in which the casing has separated from the encased meat mass.

Fibrous webs—which are utilized in the production of all types of food casings, including dry sausage casings—are supplied in master rolls to the casing manufacturer. These master rolls are then slit along their width to provide lesser rolls of fibrous webs which are then employed in the production of fibrous food casings. These fibrous webs vary in extensibility in the transverse direction of the web more than other, commercially produced papers due to the binding processes employed in their manufacture. It is not unusual, therefor, that fibrous webs consisting of these lesser rolls are selected from different parts of the master roll of fibrous web in the production of fibrous food casings. This results in the production of fibrous food casings that exhibit wide variations in extensibility although they are, ostensibly, the same size. This variation in extensibility in turn affects the dimensional uniformity of meat products encased in these fibrous food casings.

It has been found that each of these un-related and disassociated problems of enhancing the adherence of a dry sausage casing to a meat mass encased, processed and dried therein and improving the extensibility of fibrous webs employed in the manufacture of food casings, can be overcome by the proper utilization of a bonding agent comprising a thermosetting resin.

Turning first to the problems associated with dry sausage casings, it is well known in the art that cellulosic casings are utilized in the sausage industry as containers for processing food products encased therein as well as a protective wrapping for the finished product. As is well known to those skilled in the art, products such as Lebanon bologna, summer sausage and dry salami, and other products are commonly referred to as "dry sausages" and are processed over extended periods of time according to conventional practices and/or are allowed to dry over prolonged periods of time. In general, it has been difficult to prepare these dry sausages such that they will exhibit good storage life in regenerated cellulose casings because the casing has a tendency to separate from the meat mass during processing. The result is not only on unsightly product, but a condition which gives rise to mold growth on the meat surface at the point of casing separation.

In the past, attempts have been made to eliminate or minimize this effect by coating the interior of the casing with a water soluble material such as gelatin. Although the casing obtained from this method does tend to adhere to the sausage mass during the drying process, these casings are difficult to produce since elevated temperatures are required to keep the coating ingredients in solution and maintain a sufficiently low viscosity to permit application of a uniformly thin coating. Since viscosity is difficult to control, the uniformity of the coating varies from batch to batch. Another problem encountered in the gelatin methods of coating casings, is the loss of the gelatin from the casing during the presoaking or during the cooking steps of the dry sausage process. These problems of controlling and maintaining the desired amount of gelatin require an excess of gelatin be used. This, in turn, results in obtaining too high a level of adhesion between the casing and the encased meat product. Upon stripping the casing from the meat product, the surface of the meat product becomes scarred and scuffed.

An object of this invention is to provide a food casing which will adhere to a food mass encased and processed therein and which can be removed therefrom with minimal scarring of the surface of the processed food mass.

Another object of this invention is to provide a fibrous web which can be utilized in the production of fibrous food casings, which fibrous webs will exhibit improved extensibility and yield a fibrous food casing having greater dimensional uniformity.

Other objects and advantages of the invention will become apparent hereinafter.

According to one embodiment of the present invention, the inner surface of a cellulose sausage casing is coated with a water soluble or water dispersible cationic thermosetting resin. The casing is then heated and dried in order to cure the resin to a water insoluble state and to form a permanent bond between the resin and the inner wall of the casing. The casing produced in accordance with the methods of this invention does not lose its effectiveness on soaking in water and will readily adhere to the surface of a food mass encased therein during the prolonged processing and drying periods required to obtain a dry sausage product. The casing can then be readily removed from the dry sausage product without scarring or scuffing the surface of the dry sausage product.

The present invention will become more clear when considered together with the accompanying drawing in which there is illustrated one apparatus exemplary of the many apparatus which can be employed to practice the present invention.

In the single figure comprising the drawing, a flattened, tubular, cellulosic sausage casing 10, after having been formed and washed, is glycerinated in accordance with presently accepted commercial methods, during its passage through tub 11 which contains a glycerin-water solution 12. The time of travel through tub 11 and the concentration and temperature of the glycerin-water solution 12 will determine the amount of glycerin absorbed by the casing. This procedure is well known to those skilled in the art.

Following glycerination, the tubing passes between squeeze rolls 13 which minimize any solution carry-over, and which also act as guide rolls to direct the casing to guide roll 14. After passing over guide roll 14, the casing is trained about a lower idler roll 16 and then to an upper pair of driven squeeze rolls 18. A thermosetting resin coating composition 17 is maintained within the casing between roll 14 and squeeze roll 18. The pressure exerted on the casing by the upper squeeze rolls 18 prevents any excess carry-over of the coating composition.

The coating composition 17 is introduced into the casing in accordance with conventional methods by cutting the casing in two at a point between roll 14 and squeeze rolls 18 and inserting the desired amount of composition 17. The casing is then fed through squeeze rolls 18 and the severed casing ends are tied together around a short length of hollow rubber tubing insert so that an uninterrupted path for the flow of gas or air through the connection is provided.

As the casing continuously passes from roll 14, around roll 16 and then through squeeze rolls 18, successive portions of the inside surface of the casing contact the coating composition 17 and are coated therewith. The rate of travel of the casing, the initial concentration of the composition 17, the amount of pressure applied by squeeze rolls 18 and the rate of exhaustion and depletion of the composition 17 are factors that will determine the amount of composition with which the inside surface of the casing will be coated and the frequency with which the composition will require replenishing.

Following the coating of the inner surface of the casing and its passage through squeeze rolls 18, it is passed over guide roll 19, through driven squeeze rolls 20 and into a heating or drying chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device, such as circulating hot air chambers, which will dry the sausage casing to the proper moisture content and also bond the thermosetting resin to the inside wall of the casing by curing the thermosetting resin.

After the casing passes out of the heating chamber 21 and through squeeze rolls 22, it passes over guide roll 23 and is wound up on reel 24. The casings are then cut into designated lengths from the reel stock and are used in preparing dry sausage products by methods known to those skilled in the art.

The following examples are set forth as being illustrative of the present invention and are not intended, in any manner, to be limitative thereof. Unless otherwise indicated, all parts and percentages are by weight.

In Examples I–XX, a cationic thermosetting resin coating composition was made to the indicated concentration based on weight percent of the resin solids. The resulting coating composition was then placed inside the gel casing after glycerination and prior to drying as described and illustrated hereinabove. After the casings were internally coated, they were passed, in the inflated state, through a circulating hot air dryer wherein the air was maintained at a temperature of between about 65° C. to 110° C. for a period of time (5–15 minutes) sufficient to cure the resin and dry the casings to a final moisture level of between about 4% to 8%. Unless otherwise indicated, the casings selected for testing were those coated and dried during the first five minutes of each run to minimize changes in coating concentration.

In the Examples I–XVII, regenerated cellulose casings containing a commercially obtained, untreated (bonded with acid regenerated viscose) paper web embedded therein, commonly known as fibrous casings, were coated internally with the indicated compositions. The casings were then stuffed with a salami meat emulsion comprised of pork, beef, salt, sugar, spices and sodium nitrate and then processed as known in the art by heating and smoking to an internal temperature of about 147° F.–150° F. After processing, the meat products were stored at 40° F. overnight. Upon removal from the 40° F. cooler, the dry sausage products were allowed to equilibrate to room temperature for about two to three hours prior to strip testing. The adhesion values obtained by this method are directly related to the values obtained in testing the adhesion of dry sausage products to casing after prolonged processing and drying periods of the encased, dry sausage product.

The force required to strip the casing from the dry sausage product was determined by making two cuts in the casing, ¾ inch apart, parallel to the longitudinal axis of the dry sausage and measuring the amount of force necessary to pull the strip from the dry sausage. This was done by making a third cut perpendicularly across the two parallel cuts, freeing a segment of the strip of casing and measuring the average force necessary to pull the rest of the ¾ inch strip from the dry sausage, using a spring loaded scale attached to the free end of the strip of casing. A measure of this force is an indication of the tendency for the casing to adhere to the meat mass.

Examples I–V

A water soluble cationic thermosetting resin, comprising the reaction product of epichlorohydrin and a polyamide prepared by reacting adipic acid with diethylenetriamine was coated onto the interior wall of cellulose casing containing commercially obtained untreated fibrous webs embedded therein. The casings were then dried and the resin cured as described above. The resin employed was commercially obtained as a pale amber liquid having a 10% solids content, a density of 1.026, a viscosity of 30 centipoises at 25° C. (Brookfield) a pH of 5.0, and a nitrogen content (dry solids basis) of 12.8% (Kjeldahl). The thusly coated and treated casings were then stuffed with a salami emulsion and processed as described above.

Upon removal from the 40° F. storage cooler, the dry sausage products were permitted to equilibrate to room temperature for about two to three hours prior to strip testing. The results obtained are shown in Table A.

TABLE A

| Example | Concentration of Resin in Coating Solution (Wt. percent) | Average Stripping Force in Pounds |
| --- | --- | --- |
| I | 0 | 0.27 |
| II | 0.02 | 1.12 |
| III | 0.04 | 1.09 |
| IV | 0.07 | 1.28 |
| V | 0.13 | 1.08 |

Examples VI–IX

In order to demonstrate the working life of the water soluble, epichlorohydrin-polyamide cationic thermosetting resin used in Examples I–V, three liters of solution having a concentration of 0.02 weight percent solids of the resin were employed to treat the inner surface of approximately a 900 foot length of an 8 inch dry circumference cellulosic casing having a paper web embedded therein. At the end of the run, about 1½ liters of solution remained. The calculated total surface area treated was about 600 square feet. The calculated amount of cured resin utilizing was about 0.015% by weight of resin to dry cellulose.

The casing samples were taken after 0 foot (control), 300 foot, 600 foot and 900 foot lengths of the inner surface of the casing had come in contact with the resin solution. The casings were internally coated and dried as described hereinabove. The casings were then stuffed with salami emulsion and processed in the same manner as in Examples I–V. The stripping test results are presented in Table B.

TABLE B

| Example | Concentration of Resin in Coating Solution (Wt. Percent) | Sample Position From Start of Run, Ft. | Average Stripping Force in Pounds |
|---|---|---|---|
| VI | 0.0 | 0 | 0.27 |
| VII | 0.02 | 300 | 1.19 |
| VIII | 0.02 | 600 | 1.26 |
| IX | 0.02 | 900 | 1.12 |

From the data above, it can be seen that a dilute concentration of the water soluble cationic epichlorohydrin-polyamide resin promotes adhesion of the casing to the meat product encased therein and the effectiveness of the coating composition is maintained throughout a prolonged run.

Examples X–XIII

The same method and tests were repeated as set forth in Examples I to V above except that the cationic thermosetting resin employed was a modified melamine-formaldehyde resin. This resin was commercially obtained as a sirup having a solids content of about 25–28% and a pH of 6.8 to 7.8. Typical properties of the resin sirup, which is soluble in water in all proportions, are free formaldehyde 19–21%; total formaldehyde 28–30%; specific gravity at 25° C. of 1.13 to 1.15; and a nitrogen factor (percent N$x$ factor=percent resin) of 4.8. The resin sirup was diluted to the indicated concentrations prior to treatment of the inner wall of the casing. The results obtained are shown in Table C.

TABLE C

| Example | Concentration of Resin in Coating Solution (Wt. Percent) | Average Stripping Force in Pounds |
|---|---|---|
| X | ¹0 | 0.23 |
| XI | 0.03 | 0.56 |
| XII | 0.07 | 0.72 |
| XIII | 0.13 | 0.68 |

¹ Control.

Examples XIV–XVII

The same method and tests were repeated as is set forth in Examples I to V above except that the cationic thermosetting resin employed was a modified urea-formaldehyde resin in the concentrations set forth in Table D. The resin sirup was commercially obtained and was diluted to the concentrations indicated in Table D below. Typical properties of the resin sirup, which is soluble in water, are a specific gravity at 25° C. of 1.15; a viscosity (Gardner-Holdt at 25° C.) of A–B; a nitrogen content (dry basis) of 19.3% (Kjeldahl); and a freezing point of −5° C.

TABLE D

| Example | Concentration of Resin in Coating Solution (Wt. Percent) | Average Stripping Force in Pounds |
|---|---|---|
| XIV | 0.0 | 0.27 |
| XV | 0.04 | 0.69 |
| XVI | 0.07 | 1.10 |
| XVII | 0.13 | 0.88 |

Examples XVIII–XX

The inner surface of a 6½" width regenerated cellulose casing made from viscose and produced by the method described in the U.S. patent to Shiner et al. (2,999,756) was coated with a water soluble cationic epichlorohydrin-polyamide thermosetting resin. The casing was dried and the resin cured by the same method employed in Examples I–V above.

The casings were then stuffed with bologna sausage emulsion comprised of veal, pork, beef, dried skim milk powder, salt, spices, sodium nitrate and sodium nitrite and then processed as known in the art by heating and smoking to an internal temperature of between about 147° F.–150° F. After smoking, the dry sausage product obtained was hot showered, cold showered and stored overnight at 30° F.–40° F. Stripping tests were run the morning after processing. The results of the stripping tests are shown in Table E.

TABLE E

| Example | Concentration of Resin in Coating Solution (Wt. Percent) | Average Stripping Force in Pounds |
|---|---|---|
| XVIII | 0.0 | 0.11 |
| XIX | 0.05 | 0.21 |
| XX | 0.075 | 0.33 |

In the practice of the present invention, the quantity of cationic thermosetting resin needed to impart the desired improved adhesion characteristic to the casing is important. The quantity of resin needed to obtain the desired improved adhesion of the casing to the encased food mass is very small, i.e., less than 0.1% by weight of resin to dried casing can be used and preferably less than 0.50%. Resin in an amount of about .02% and less has also proven to be effective. Surprisingly, it has been found that the upper limit of resin concentration is not critical. For example, resin concentrations up to about 0.25% have also been found to be operable. As shown in the examples, increasing the resin content beyond certain effective levels does not appreciably increase the stripping force between the casing and the encased meat product. However, a quantity of resin greatly in excess of that needed to impart the desired adhesion of the casing to the encased meat product can adversely affect the moisture vapor transmission, elasticity and other desirable characteristics of the casing.

Preferably, the amount of cationic thermosetting resin employed to coat the inner wall of the casing will be such as to cause minimal changes in the desirable characteristics of the casing, will permit the casing to adhere to a food mass encased therein as the encased food mass dries and shrinks in volume, and will allow the casing to be peeled from the dry sausage product obtained with a minimum of scuffing or scarring of the surface of the dry sausage product.

It should be understood that each particular cationic thermosetting resin will have an optimum concentration for each method of application employed, each type of dry sausage product to be packaged, etc. In the practice of this invention, those skilled in the art can readily determine, by simple empirical tests, the optimum concentrations, and mode of operation to be used for any particular casing and type of dry sausage product. For example, other solvent media, such as alcohol, can also be used for the thermosetting resin coating composition.

In the practice of this invention, it is preferred that the moisture content of the casing be reduced to below about 10% by weight, such as to between about 4% to 8% by weight, following application of the coating composition to the inside wall of the casing. After the coating composition has reacted with the inside wall of the casing, the casing can be re-wet and the moisture content increased without any loss in the effectiveness of the adhesion characteristics of the coated casing.

Since the sausage casing, after glycerination and prior to drying, is in the gel form, it is preferred to apply the thermosetting resin coating composition to the sausage casing while it is in the gel form in order to assure a more uniform product.

The tensile strength, transparency, elasticity, moisture permeability and other desirable features of the casing are substantially unchanged by the treatment described above.

As is well known to those skilled in the art, food casings can also be produced from such materials as proteins, starches and other natural and synthetic polymeric materials. Hence, the term "regenerated cellulosic casing" as employed throughout this application and in the appended claims should be understood to be equivalent to and is intended to include food casings produced from such materials.

Cellulose sausage casings produced, for example, by the viscose process, the denitration of cellulose nitrate or the de-esterification of other cellulose esters can also be coated and treated according to the methods of this invention. Other cellulosic materials, such as cellulose ethers, like hydroxy ethyl cellulose can also be similarly coated and treated. The use of a cellulosic casing having a fibrous web embedded therein is preferred. A fibrous web formed of hemp fibers bonded together with regenerated cellulose is preferred as the fibrous base paper. Other nonwoven webs, such as Yoshino paper, rice paper, hemp, rayon, cotton and nylon; and woven fabrics such as muslin, marquisette, cheesecloth, organdy and viole can be used.

It should be understood that these fibrous webs are commercially obtainable. In this embodiment of the present invention, it should be further understood that these fibrous webs can be either untreated or treated in accordance with the methods of this invention as described in greater detail hereinbelow.

The coating compositions that can be employed to coat the inner wall of the casing are the cationic thermosetting resins that can be cured to the insoluble state. Examples of the water soluble or water dispersible cationic thermosetting resins that can be used are those selected from the group of resins consisting of the reaction products of an epichlorohydrin and polyamide, a modified melamine and formaldehyde and a modified urea and formaldehyde. Additionally, polyalkylenepolyamines and/or their salts, which include such polyamines as diethylenetriamine, triethylenetetramine, tetraethylenepentamine and the corresponding polypropylenepolyamines, as well as 4,4'-iminobisbutylamine, and 3,3',3" - nitrilotrispropylamine can also be employed. In general, an aldehyde-reactive polyalkylene-polyamine may be used provided the ratio of carbon atoms to nitrogen atoms therein is not greater than about 4:1.

The higher polyalkylenepolyamines can also be used including polyethylenimine (formed by homopolymerization of ethyleneimine), the long chain polyalkylenepolyamines formed by reacting a simple alkylenediamine or a simple polyalkylenepolyamine with about 0.6–1.5 mols of an alkylene dichloride, an alkylene dichlorohydrin or epichlorohydrin.

A method of preparing the epichlorohydrinpolyamine compositions is described in U.S. Patent No. 2,926,154. A method of preparing the cationic melamine-formaldehyde thermosetting resin compositions is described in U.S. Patent No. 2,796,362. A detailed method of preparing urea-formaldehyde thermosetting resins is described in U.S. Patent No. 2,616,874.

As mentioned hereinabove and set forth in Examples I–XVII, regenerated cellulosic casings having a paper web embedded therein (fibrous casings) can also be used in the practice of this invention. The paper webs used in making fibrous casings are commercially formed on conventional paper making machines wherein long hemp fibers are beat into a slurry and then formed into webs and dried. The paper web is then passed through or contacted with a dilute viscose solution and again dried whereupon the cellulose is partially regenerated. The cellulose in the viscose is further regenerated by passing the paper web through dilute acid solutions and a washing solution. The paper web is dried and cut into unit widths from a master roll for food casing manufacture. The types of materials that can be utilized in forming these paper webs are the same as has been described hereinabove.

The methods employed to produce these paper webs are controlled so that the regenerated cellulose incorporated therein and acting as a binding agent is present in the paper web in an amount sufficient to increase the web strength of the paper without materially filling the pores and interstices thereof, thus retaining the porosity characteristic of the paper web. The amount of bonding cellulose used in forming the paper web is kept at a level so that a subsequent impregnant, such as viscose, utilized to make the cellulosic casing will be absorbed in the fibers as well as the interstices of the paper. Thus, the porosity characteristic is a critical feature of paper webs utilized in producing fibrous casings. Exemplary of one method which can be utilized to treat paper webs is set forth in the U.S. Patent to Underwood (3,135,613).

The extensibility property of fibrous casing; that is, cellulosic casings having a fibrous web embedded therein, generally governs the size and shape of the encased meat products processed therein. This extensibility property is known to be directly related to the paper or fibrous web utilized as the substrate in these food casings. Variations in the extensibility of the fibrous web is reflected in the food casing and gives rise to poor, variable size control of the encased meat products processed in these food casings. This, in turn, results in difficulty when specified meat product size and weight standards are desired for required to be obtained, particularly for the food packager who subsequently slices or reduces the size of the meat product into smaller packaged units utilized in retail sales.

Due to the bonding processes employed (as described hereinabove), the fibrous webs employed in the production of fibrous casings vary in extensibility in the transverse direction of the web significantly more than do other commercially produced papers. At the transverse ends of the fibrous web, the degree of extensibility is found to be higher than that found in the center portion of the web. The paper widths utilized in producing fibrous casings are obtained from a master roll by slitting it into a number of lesser rolls having narrower widths corresponding to the desired casing size to be produced. Therefore, the narrower width papers to be utilized in producing a particular casing size can be selected from the center and end cut locations of the master roll. Under these conditions, it has been found that the fibrous casings obtained therefrom exhibit wide variations in extensibility although they are, ostensibly, the same size. By specifying that fibrous webs be obtained only from certain cut locations on the master roll, it is possible to minimize the variations in exensibility of the fibrous casings obtained therefrom. However, this type of selectivity is not commercially or economically practicable and is operably feasible for only a few select casing sizes.

In order to minimize or eliminate the wide variations of extensibility in the transverse direction of the fibrous web master roll and thereby improve the uniformity of extensibility of fibrous casing produced therefrom and ultimately obtain dimensional uniformity of the meat products processed therein, alternative bonding materials than the commercially employed acid-regenerated viscose were investigated. However, any bonding materials selected had to meet the conditions necessary to be satisfied regarding processing and performance requirements of the fibrous casings produced therefrom. In particular, the bonding agent had to be one which would meet FDA approval for use in contact with food; the fibrous web in which it was incorporated had to exhibit sufficient strength to withstand the stresses exerted during the coating operation utilized in producing fibrous casings; the amount of bonding agent employed could not interfere with viscoe penetration during the casing process and give rise to a loss of strength and detrimentally affect the appearance of the casing obtained; and, the bonding agent should be one which would not discolor during exposure of the fibrous web to the conditions of the casing process.

Surprisingly, it has been found that these requirements and conditions can be met by utilizing a cationic thermosetting resin as the bonding agent for the fibrous web. Use of a cationic thermosetting resin has also resulted in the development of two bonding methods. One method permits the elimination of one of the usual rewetting and redrying steps necessitated in the normal viscose bonding process by employing a cationic thermosetting resin in combination with viscose without acid regenerating the viscose. The other method permits the usual rewetting and redrying steps of the viscose bonding process to be completely eliminated by incorporating the cationic thermosetting resin directly in the fibrous slurry prior to formation of the fibrous web.

The fibrous food casings produced in accordance with these methods have been found to exhibit improved extensibility characteristics and retention of uniform dimensions—factors which are of importance to commercial food and/or meat packers.

The cationic thermosetting resin employed as the bonding agent is used in place of the cellulose as the binder to produce fibrous webs that are then utilized in producing fibrous food casings. In the method where a cationic thermosetting resin is added to the beater of the paper making machine containing the fibrous slurry prior to formation of the paper web, bonding of the fibers and curing of the resin occurs when the paper web is subsequently dried. In the other method, the paper web is first formed and the resin is applied ot the paper web by dipping, coating, spraying, and so forth. It should be understood that the paper web fibers can be either bonded with the resin alone or used in conjunction with a regenerated cellulose binder to produce the porous paper webs.

Fibrous casings can then be made from these porous paper webs by employing the methods such as are described in the U.S. Patents to Shiner (2,910,380) and Smith (2,105,273 and 2,144,990). In any event, it should be understood that regardless of the methods employed to produce the fibrous food casings, the thusly treated paper webs are completely embedded in the casing wall; that is, subsequent impregnation of the paper webs with viscose results in a fibrous casing wherein the treated paper web is entirely coated by and with the viscose.

The following examples are set forth as illustrative of the paper bonding embodiment of the present invention and are not intended, in any manner, to be limitative thereof. Unless otherwise indicated, all percentages and parts are by weight.

Example XXI

Webs of paper employed as substrates for fibrous, cellulosic casings were first bonded by different methods before being reeled into master rolls. Each master roll was then slit in the machine direction to obtain a plurality of lesser rolls having narrower widths representing center, intermediate and end cuts across the width of the web. As pointed out hereinabove, it is these lesser rolls of narrower width that are employed as substrates when subsequently forming fibrous, cellulosic food casings.

The tensile properties of each of the lesser rolls were obtained and are set forth in Table F below.

In Table F, the terms employed are identified as follows: "MR-I" denotes a master roll whose paper web was bonded with viscose and acid regenerated according to current commercial practices; "MR-II" denotes a master roll which was obtained by adding 1% polyamide epichlorohydrin resin (commercially available under the trade name "Kymene 557") to the fibrous slurry before the paper web was formed; "MR-III" denotes a master roll formed in the same manner as described for MR-I above except that the viscose-treated sheet, after drying, was not acid regenerated; "MR-IV" denotes a master roll whose web was treated by a combination of the processes described for MR-II and MR-III above and wherein 2.5% melamine formaldehyde resin was used in place of the polyamide-epichlorohydrin resin.

"Break Force" results were obtained by attaching one end of a spring scale to the treated paper and pulling the other end of the spring scale until the web was broken or began to separate and recording the force measured by the spring scale indicator.

"Percent Elongation at Break" results were obtained by measuring the amount the treated paper samples stretched from their position at rest until they broke or became separated.

"Extensibility" is measured in inches/pound and is defined as the slope of the Instron tensile graph before the breaking point of the paper sample being tested and is calculated as the ratio of elongation to load. The Instron crosshead speed was set at ½ inch/minute and the chart speed setting was at 20 inches/minute. Full scale load of 20 pounds and samples measuring 1 inch x 1 inch were employed.

The letters A–J, inclusive, identify the location of the cuts on the master roll from which the narrower rolls were obtained; letters A and J signifying end cuts, letter E signifying the center cut and letters B–D and F–H signifying intermediate cuts between locations A–E and E–J respectively.

TABLE F.—DRY TENSILE PROPERTIES OF DIFFERENTLY BONDED PAPERS

| Master Rolls | | Cut Locations | | | | | | | | | |
|---|---|---|---|---|---|---|---|---|---|---|---|
| | | A | B | C | D | E | F | G | H | I | J |
| MR-I | Break Force (lbs./in.) | 7.78 | 8.82 | 8.56 | 9.04 | 9.72 | 9.30 | 9.12 | 9.26 | 8.66 | 8.24 |
| | Percent Elongation at Break | 10.0 | 7.6 | 5.9 | 5.3 | 5.1 | 5.0 | 5.4 | 6.0 | 7.2 | 9.2 |
| | Extensibility (in./lb.) | 0.0156 | 0.0099 | 0.0070 | 0.0058 | 0.0053 | 0.0055 | 0.0062 | 0.0071 | 0.0098 | 0.0130 |
| MR-II | Break Force (lbs./in.) | 6.98 | 6.50 | 6.54 | 6.86 | 7.04 | 6.90 | 6.63 | 6.76 | 6.53 | 6.62 |
| | Percent Elongation at Break | 5.8 | 5.0 | 4.6 | 4.4 | 4.2 | 3.5 | 3.8 | 4.2 | 4.6 | 5.4 |
| | Extensibility (in./lb.) | 0.0099 | 0.0099 | 0.0091 | 0.0074 | 0.0061 | 0.0056 | 0.0064 | 0.0071 | 0.0088 | 0.0103 |
| MR-III | Break Force (lbs./in.) | 8.44 | 8.58 | 9.28 | 9.53 | 9.89 | 9.76 | 9.21 | 9.28 | 8.92 | 8.31 |
| | Percent Elongation at Break | 8.1 | 6.7 | 6.6 | 5.6 | 5.6 | 6.0 | 6.5 | 6.6 | 7.7 | 8.0 |
| | Extensibility (in./lb.) | 0.0114 | 0.0094 | 0.0083 | 0.0065 | 0.0060 | 0.0066 | 0.0077 | 0.0079 | 0.0104 | 0.0119 |
| MR-IV | Break Force (lbs./in.) | 8.20 | 8.51 | 8.90 | 9.08 | 9.35 | 9.34 | 9.22 | 9.13 | 8.74 | 8.52 |
| | Percent Elogation at Break | 8.2 | 7.4 | 5.7 | 5.2 | 5.6 | 5.6 | 6.0 | 6.6 | 7.0 | 8.0 |
| | Extensibility (in./lb.) | 0.0110 | 0.0102 | 0.0072 | 0.0062 | 0.0061 | 0.0059 | 0.0066 | 0.0079 | 0.0097 | 0.0108 |

From the results tabulated above, it can be seen that the cuts taken from MR-I, the acid regenerated viscose bonded paper, exhibit the least amount of uniformity of extensibility from the center cut location (E) to the end cut location (A and J) of the master roll. The cuts taken from MR-III, the non-acid regenerated heated viscose bonded paper, and the cuts taken from MR-IV, paper bonded in the same manner as MR-III but with melamine formaldehyde resin added to the fibrous slurry, exhibit improved uniformity of extensibility from the center cut (E) to the end cuts (A and J). However, the best uniformity of extensibility is exhibited by MR-II wherein the polyamide-epichlorohydrin resin was added to the fibrous slurry prior to forming the paper web.

Example XXII

The treated papers of Example XXI were used as substrates in forming fibrous, cellulosic tubular casings. The thusly formed casings were tested for extensibility by measuring the casing wet diameter when inflated to an internal air pressure of 150 mm. Hg thereby simulating stuffing pressure. The ratios of the diameters of casings formed from various cut locations to the diameter of a casing formed with the center cut (E) of the particular treated paper were calculated to demonstrate the differences in extensibility of the various casings. The results obtained are set forth in Table G below wherein the treated papers taken from the master rolls and their cut locations in the master rolls are identified in the same manner as is set forth in Example XXI above.

found that a force of 0.23 pound was required to strip the fibrous casing utilizing MR-I from the encased meat product while a force of 0.79 pound was required to strip the casing utilizing MR-II from the encased meat product.

Example XXIV

In today's commercial market, dimensional uniformity of encased, processed meat products is important since these products are subsequently sliced and packaged in units of equal or nearly equal weight. Control of the overall circumference of encased, processed meat products is a critical factor to the producer of uniform meat

TABLE G.—EXTENSIBILITY OF CASINGS PRODUCED FROM DIFFERENTLY BONDED PAPERS

| Master Rolls | | Cut Locations | | | | | | | | | |
|---|---|---|---|---|---|---|---|---|---|---|---|
| | | A | B | C | D | E | F | G | H | I | J |
| MR-I | Wet diameter of— | | | | | | | | | | |
| | casing at 150 mm. Hg (in.) | 4.14 | 4.10 | 4.06 | 4.04 | 4.02 | 4.03 | 4.03 | 4.06 | 4.12 | 4.16 |
| | Casing diameter to casing from center cut (E) | 1.029 | 1.020 | 1.010 | 1.005 | 1.000 | 1.002 | 1.002 | 1.010 | 1.025 | 1.034 |
| MR-II | Wet Diameter of— | | | | | | | | | | |
| | casing at 150 mm. Hg (in.) | 4.06 | 4.04 | 4.03 | 4.00 | | | | 4.04 | 4.06 | 4.08 |
| | Casing diameter to casing from center cut (E) | 1.015 | 1.010 | 1.008 | 1.000 | | | | 1.010 | 1.015 | 1.020 |
| MR-III | Wet Diameter of— | | | | | | | | | | |
| | casing at 150 mm. Hg (in.) | 4.08 | | | | 3.99 | | | | | |
| | Casing diameter to casing from center cut (E) | 1.022 | | | | 1.000 | | | | | |
| MR-IV | Wet Diameter of— | | | | | | | | | | |
| | casing at 150 mm. Hg (in.) | 4.90 | 4.06 | 4.03 | 4.00 | 4.00 | 4.02 | 4.03 | 4.04 | 4.08 | 4.08 |
| | Casing diameter to casing from center cut (E) | 1.023 | 1.015 | 1.008 | 1.000 | 1.000 | 1.006 | 1.008 | 1.010 | 1.020 | 1.020 |

The results set forth in Table G above reveal that casings formed when utilizing the treated papers from MR-I have diameters which vary as much as 3% from the center cut location to the end cut locations. On the other hand, casings formed utilizing the treated papers from MR-II, MR-III and MR-IV exhibit diameter variations from center cut locations to end cut locations which range down to about 2%. Considering the end requirements and the uses of the fibrous cellulosic casings, this reduction in casing diameter variation is significant.

Example XXIII

Sample casings were formed from the treated papers of MR-I and MR-II. An end cut sample (J) and a center cut sample (E) from these master rolls formed into fibrous, cellulosic tubular food casings in the same manner as described hereinabove. The sample casings were then field tested by first stuffing them with a bologna meat emulsion and then processing them in a smokehouse according to conventional practice. The circumferences of the stuffed casings were measured before and after processing and the ratio of the circumferences of the casings formed from the end cut (J) and center cut (E) was computed. The results obtained are set forth in Table H below:

packages. Extreme variations in the circumferences of encased meat products are important to the packaged meat producer for several reasons:

(1) Excessively large circumferences will interfere with the packaging of sliced meat products since the size of the slice obtained either exceeds the size of the other slices in the packages or, exceeds the dimensions of conventional apparatus employed to retain the stacked slices during packaging.

(2) Excessively small circumferences will result in small slice sizes which detract from the package appearance and the subsequent saleability of the packaged product. Additionally, poor utilization of the shipping carton space is encountered since the unit package will be of greater height requiring more slices to achieve the desired package weight.

(3) The range of circumferences from maximum to minimum will directly affect the time and labor required to adjust slice thicknesses and adjust the number of slices in a unit package to obtain the desired weight.

In order to further demonstrate the practical importance of obtaining uniformity in casing dimensions, therefor, an additional field test was conducted wherein the overall circumferences of encased, processed meat products were obtained from top to bottom of the encased

TABLE H.—FIELD TESTING OF STUFFED CASINGS

| Casings From Master Roll | | Circumference (in.) | | Ratio of Circumferences (J) / (E) |
|---|---|---|---|---|
| | | End Cut (J) | Center (E) | |
| MR-I | Stuffed, Unprocessed | 12.9860 | 12.6475 | 1.027 |
| | Stuffed, Processed | 12.5975 | 12.2675 | 1.027 |
| MR-II | Stuffed, Unprocessed | 12.8225 | 12.6025 | 1.016 |
| | Stuffed, Processed | 12.4250 | 12.2150 | 1.017 |

The data tabulated in Table H above indicate that the dimensional uniformity of the encased meat product is generally improved and that the ratio of the casing circumferences obtained from the end cut and center cut of polyamide-epichlorohydrin resin treated paper (MR-II) is less than that obtained from the casings formed from the same cut locations of the acid regenerated viscose paper (MR-I).

These casings were then stuffed with a salami emulsion and processed in the same manner as described in Examples I-V above. The dry sausage products obtained were then tested for stripping and peelability in accordance with the procedure outlined hereinabove. It was product. Measurements were taken at two inch intervals to illustrate the variation in product circumference from top to bottom and the extremes of maximum and minimum product circumference. Since, during conventional processing, the encased meat product is suspended, the smaller circumference is at the top while the larger circumference is at the bottom. This is a normal result of the displacement of the semi-fluid meat emulsion toward the bottom of the casing during suspension due to the weight of the meat emulsion itself.

In the field test conducted, fibrous casings were formed utilizing the end cut (J) and center cut (E) from master rolls MR-I and MR-II in the same manner as set forth in Example XXIII above. The results obtained are set forth in Table I below:

TABLE I.—FIELD TEST OF VARIATION IN CASING CIRCUMFERENCE

| Point of Measurement from Top of Casing (in.) | MR-I Circumference (in.) | | MR-II Circumference (in.) | |
|---|---|---|---|---|
| | Center Cut (E) | End Cut (J) | Center Cut (E) | End Cut (J) |
| 3 | 11.3750 | 11.6875 | 11.3125 | 11.5938 |
| 5 | 12.0313 | 12.4375 | 12.0000 | 12.3125 |
| 7 | 12.1250 | 12.4688 | 12.0625 | 12.4063 |
| 9 | 12.2188 | 12.5625 | 12.0938 | 12.4375 |
| 11 | 12.2500 | 12.5625 | 12.1250 | 12.4375 |
| 13 | 12.2813 | 12.6250 | 12.1250 | 12.5000 |
| 15 | 12.3438 | 12.6875 | 12.2188 | 12.5625 |
| 17 | 12.3750 | 12.7188 | 12.2813 | 12.5625 |
| 19 | 12.4063 | 12.7500 | 12.28183 | 12.6250 |
| 21 | 12.4375 | 12.7813 | 12.3438 | 12.6250 |
| 23 | 12.4688 | 12.8438 | 12.3438 | 12.6250 |
| 25 | 12.5313 | 12.8750 | 12.3438 | 12.6563 |
| 27 | 12.5625 | 12.9063 | 12.4063 | 12.6875 |
| 29 | 12.5625 | 12.9063 | 12.4063 | 12.6875 |
| 31 | 12.5625 | 12.9075 | 12.4063 | 12.7500 |

In a particular meat packer's application selected at random, it was found that sliced bologna is packaged in units weighing 7 ounces with a tolerance in package weight permissible up to 7.16 ounces. Under these criteria, the meat packer has established specifications for minimum slice circumference at 12" and maximum slice circumference at 12.75".

With reference to the data set forth in Table I above, it can be seen that the maximum circumference that the meat packer can tolerate is exceeded in the encased, processed bologna product wherein the casing employed was one which utilized the end cut of the treated paper from MR-I (acid regenerated viscose). During packaging, the slices obtained from the bologna product in this casing caused the apparatus which holds the stacked slices in place to jam. From a commercial viewpoint, therefor, the product obtained from this casing would not be acceptable to a meat packer. The bologna product obtained wherein the casing employed utilized the end cut of the treated paper from MR-II, on the other hand, at no point exceeded the dimensional requirements of the meat packer.

Bologna processed in both the MR-I and MR-II casings failed to meet the minimum circumference requirements when measured at a point 3 inches from the top of the casings due to the downward displacement of the meat emulsion during processing of the vertically suspended meat products. This portion of the bologna is generally either reworked or utilized to adjust passcakage weight.

Excluding the top 3 inches of each bologna product, it can be seen from Table I, that the range of circumferences of the bologna products obtained from casings utilizing the center cut treated paper from MR-I was 12.03" to 12.56" while that obtained from casings utilizing center cut treated paper from MR-II was 12.00" to 12.41". As a result, the bologna product obtained in the casings utilizing the MR-I paper resulted in a wider range of circumference dimensions which required greater frequency in adjusting the weight or the number of stack slices in order to remain within the prescribed package weight.

To demonstrate the significance of small differences in casing circumference, it is possible to compute the change in product circumference that will necessitate adjustment of package weight by employing the following equation:

$$\text{Net package weight} = \frac{(\text{Circumference})^2 (\text{Height})(\text{Density})}{4\pi}$$

wherein "Density" is the density of the particular meat emulsion expressed in ounces per cubic inch.

For the particular meat packer's application described above, it has been pointed out that the minimum and maximum package weight required was 7 ounces and 7.16 ounces, respectively. The density of the bologna product obtained was found to be 0.59 ounce per cubic inch. Utilizing a nominal package height of 1.0 inch, the incremental change in product circumference that will require adjustment can be computed by inserting these values in the above equation first using the maximum weight value and then the minimum weight value. The difference between the values obtained, when inserting maximum and minimum weight values, will result in finding the incremental product circumference change requiring adjustment. Employing the above values, it was found that for this particular meat packer's application, a change in product circumference of as little as 0.15 inch would require adjustment of slice thickness.

In the bologna product obtained from the casing utilizing center cut treated paper from MR-II and having an overall circumference range of 0.41 inch, it can be seen from Table I that slice thickness would have to be adjusted 2 times. In the bologna product obtained from the casing utilizing center cut treated paper from MR-I and having an overall circumference range of 0.53 inch, package weight would have to be adjusted 3 times. It can be seen, therefor, that a product having a wider circumference range will require more frequent adjustment of slice thickness. The lag in making these adjustments will, in turn, result in packages requiring manual weight adjustment either by adding or removing slices or portions of slices which, in turn, affects the speed of the packaging operation.

In this field test, it was found that 34% of the product packages made from the bologna product obtained from the casing utilizing treated paper from MR-II required weight adjustment while 42% of the product packages made from the bologna product obtained from the casing utilizing treated paper from MR-I required weight adjustment.

From these results, it can be seen that the dimensional requirements of products processed in fibrous casings whose paper substrates have been treated with a cationic thermosetting resin can be more closely controlled, more readily employed within the operating limits of the meat packer and more readily provide the weight requirements of the unit packages to be produced.

Example XXV

The effectiveness of bonding paper substrates with a cationic thermosetting resin after they have been formed into a web was determined by hand-bonding sheets of unbounded paper. The sheets were hand-bonded by first dipping them into an aqueous solution containing a known concentration of polyamide-epichlorohydrin resin until the sheets were saturated. The excess liquid was blotted off and the saturated paper sheets were squeeze-dried between layers of absorbent paper. Samples of the thusly treated paper sheets were then mounted in a restraining hoop and placed in an oven to dry and cure. The temperature of the oven was maintained at about 105° C. and the samples were kept in the oven for a period of about 15 minutes.

Upon removal from the oven, the tensile properties of the sheets were determined. A portion of the sheets were then converted to fibrous, reinforced cellulosic sheets by hand-coating the sheets with viscose, followed by acid regeneration and washing. The tensile properties of the thusly treated sheets were then determined.

The results of these determinations are set forth in Table J below. In Table J, the values listed in the column labeled "Water Wet Break Strength" were obtained by soaking samples of the paper sheets treated with polyamide-epichlorohydrin resin in water until they were thoroughly wet and then placing the wetted samples in the Instron testing apparatus. The values listed in the column labeled "6% NaOH Wet Break Strength" were derived in the same manner as those for "Water Wet Break Strength" except that sodium hydroxide (NaOH) was added to the water until a NaOH concentration of about 6% was obtained. At this level of NaOH concentration, immersion of the sheets in the solution closely simulates the condition of a paper substrate when it is coated with viscose in accordance with commercial casing manufacturing processes since viscose normally contains a 6% NaOH concentration. The values obtained from these tests and listed in Table J are expressed in grams per inch width of sample paper tested.

TABLE K.—TENSILE PROPERTIES OF PAPERS FORMED FROM FIBROUS SLURRY HAVING A THERMOSETTING RESIN ADDED THEREIN

| Paper Density (lbs./ream-mil) | Percent Resin in Bonded Paper | Dry Break Strength | | Wet Break Strength | | 6% NaOH Wet Break Strength | |
|---|---|---|---|---|---|---|---|
| | | MD | TD | MD | TD | MD | TD |
| 2.5 | 1.0 | 2,599 | 2,385 | 685 | 707 | 191 | 214 |
| 2.5 | 1.5 | 2,430 | 2,239 | 714 | 650 | 191 | 188 |
| 4.0 | 1.0 | 3,056 | 3,038 | 989 | 921 | 286 | 268 |
| 4.0 | 1.5 | 3,589 | 3,049 | 937 | 919 | 281 | 276 |

TABLE J.—TENSILE PROPERTIES OF HAND-BONDED PAPERS AND REINFORCED REGENERATED CELLULOSE SHEETS PRODUCED THEREFROM

| Percent Resin in Saturating Solution | Tensile Properties of Resin-Treated Paper | | | | Tensile Properties of Reinforced Regenerated Cellulose Sheets | |
|---|---|---|---|---|---|---|
| | Water Wet Break Strength (g./inch width) | Percent Elongation at Break | 6% NaOH Wet Break Strength (g./inch width) | Percent Elongation at Break | Water Wet Break Strength (lbs./inch width) | Percent Elongation at Break (lbs./inch width) |
| 0 | 0 | | 0 | | 15.9 | 39.5 |
| 0.25 | 492 | 5.5 | 55 | 6.1 | 18.6 | 42.8 |
| 0.50 | 585 | 5.4 | 68 | 5.8 | 18.6 | 34.4 |
| 1.00 | 737 | 4.7 | 121 | 5.7 | 18.2 | 38.0 |
| 2.00 | 873 | 5.9 | 166 | 3.5 | 20.2 | 33.0 |
| 3.00 | 887 | 5.9 | 173 | 3.7 | 20.7 | 37.2 |

From the results set forth in Table J above, it can be seen that a resin concentration in the saturating solution of between about 2.0%–3.0% imparts sufficient strength to the paper enabling it to be used in the casing processes. It can also be seen that the reinforced regenerated cellulose sheets formed from the paper treated with the thermosetting resin exhibited increased strength.

Example XXVI

The utility of converting a web of paper bonded with a thermosetting resin into a fibrous, tubular cellulosic casing on a commercial casing apparatus was determined by first saturating a paper web of sufficient length with an aqueous solution containing 3% by weight polyamide-epichlorohydrin resin. The thusly treated paper web was then dried for a period of about 30 seconds by placing it in contact with the surface of a rotating, heated drum, the internal temperature of the drum being maintained at about 125° C. No difficulty was encountered in running the treated paper web through the casing manufacturing process and the casings obtained were satisfactory in appearance.

The burst pressures of these casings were also determined by closing one end of the tubular casings and inflating them with air through their open ends until the casings ruptured. The burst pressure for the casings formed with paper bonded with the thermosetting resin was found to be 485 mm. Hg while the burst pressure for casings formed with regular viscose bonded paper was found to be 450 mm. Hg.

These results indicate that it is feasible to commercially produce casings formed with paper bonded with a thermosetting resin and that these casings exhibit higher burst pressures than do casings formed with viscose bonded paper.

Example XXVII

The effect of adding a thermosetting resin to a fibrous slurry before the web of paper is formed was explored with papers having different densities and different concentrations of thermosetting resin present in the bonded papers.

The tensile properties of the thusly bonded and dried papers were obtained in the same manner as described hereinabove in Example XXV and are set forth below in Table K. In Table K, the values listed in the column labeled "Dry Break Strength" were obtained in the same manner as those listed under "Wet Break Strength" except that the papers were not wet and the terms "MD" and "TD" signify the "machine direction" and the "transverse direction," respectively, of the web of paper formed in a commercial paper manufacturing apparatus. The thermosetting resin employed as polyamide-epichlorohydrin. All strength units are expressed in grams per inch width.

As can be seen from the results set forth above, although the bonded papers having the higher density exhibited increased strength, the effect of the resin bonding was about the same in both instances.

Example XXVIII

The bonded papers of Example XXVII were utilized to form tubular casings and the burst pressure of these casings were compared with the burst pressure of a fibrous casing utilizing commercial acid regenerated viscose paper. The burst pressures of the casings utilizing the commercial paper was found to be about 440 mm. Hg while the burst pressures of casings utilizing bonded papers containing 1.0% and 1.5% polyamide-epichlorohydrin resin were found to be about 490 mm. Hg and 455 mm. Hg, respectively. These results indicate that while casings utilizing papers bonded with a thermosetting resin exhibit greater burst pressures than casings utilizing acid regenerated viscose bonded papers, an increase in the resin content of the bonded paper does not necessarily cause an increase of the burst pressure of casings subsequently formed therefrom.

Example XXIX

An evaluation of the burst pressures of casings utilizing bonded paper webs containing 1% polyamide-epichlorohydrin resin and selected from different cut locations on the master roll was made and compared to control casings utilizing paper webs bonded only with acid regenerated viscose. The same procedures were followed as set forth in Example XXI above with regard to the process of bonding a paper sheet with acid regenerated viscose and with regard to identifying the cut locations. The results obtained are set forth in Table L below wherein the burst pressure values are expressed in mm. Hg.

TABLE L.—BURST PRESSURES OF CASINGS UTILIZING RESIN BONDED PAPER AND VISCOSE BONDED PAPER (MM. HG)

| Paper Used | Cut Locations | | | | | | | | | |
|---|---|---|---|---|---|---|---|---|---|---|
| | A | B | C | D | E | F | G | H | I | J |
| Resin Bonded | 465 | 476 | 485 | 496 | | | 493 | 468 | 483 | |
| Control [1] | 398 | 415 | 398 | 426 | 421 | 444 | 426 | 444 | 434 | 428 |

[1] Viscose Bonded.

As can be seen, burst pressures obtained with casings utilizing the resin bonded paper are consistantly higher and more uniform than those obtained with the control casings.

Example XXX

As has been illustrated hereinabove (Example XXI and Table F) elimination of the acid regeneration of the bonding viscose and subsequent drying step was found to be advantageous in improving the uniformity of extensibility of viscose bonded webs produced by present commercial practices. However, webs bonded by non-acid regenerate viscose were found to exhibit low strength when subsequently used in fibrous casing manufacture and were, therefor, not capable of being efficiently run through commercial casing apparatus. To overcome this deficiency, it was found that webs bonded in this manner could be stored under controlled conditions of humidity and temperature for a period of about 3 weeks during which time auto-regeneration of the viscose takes place and the strength of the paper is improved.

In order to avoid the need to store this paper and thereby improve its strength, the effect of bonding a paper web with a cationic thermosetting resin by adding the resin to the fibrous slurry followed by viscose bonding of the subsequently formed web, without acid-regeneration, was determined.

The paper bonded with a thermosetting resin was obtained by adding melamine formaldehyde resin in the fibrous slurry prior to web formation in an amount sufficient to yield a bonded paper web having a 2.5% melamine formaldehyde resin content. The thusly bonded paper was then further bonded with viscose without acid regeneration. The papers were then dried for a period of 30 seconds at a temperature of between about 190° F.–200° F. and the tensile properties of the papers were then determined after elapsed periods of time by subjecting them to the 6% NaOH Wet Break Strength test described hereinabove. The results of these tests are set forth in Table M below.

TABLE M.—DEVELOPMENT OF STRENGTH IN VISCOSE BONDED PAPERS WITHOUT ACID REGENERATION

[6% NaOH Wet Break Strength (lb./in.)]

| Elapsed Time (days) | Melamine Formaldehyde Viscose Bonded Web | Control |
|---|---|---|
| 1 | | 0 |
| 2 | 0.77 | |
| 8 | | 0 |
| 9 | 0.63 | |
| 21 | | |
| 23 | 1.28 | 0.23 |

The results set forth in Table M above reveal that the paper bonded with melamine formaldehyde resin and viscose exhibited a higher initial strength than the control and that this strength was retained and improved with the passage of time. Although, the control paper also exhibited an increase in strength from auto-regeneration of the viscose, this occurred only after a prolonged period and was much less than that exhibited by the paper bonded with melamine formaldehyde and viscose at the end of the same period.

Example XXXI

A comparison of the tensile strengths of a plurality of papers each bonded in accordance with a different method was obtained by subjecting the papers to the break strength tests described hereinabove. The water climb rate of the bonded papers was also measured in order to determine the relative absorbtivity of the differently bonded papers. The values for the water climb rate were obtained by utilizing a method similar to ASTM-D202–55T Absorption.

The results obtained are set forth in Table N below wherein the papers bonded with melamine formaldehyde resin were obtained by adding the resin to the fibrous slurry in amounts sufficient to obtain bonded papers containing the indicated amounts of melamine formaldehyde resin and the terms "MD" and "TD" denote "machine direction" and "transverse direction," respectively, of the commercial paper forming apparatus employed.

TABLE N.—TENSILE PROPERTIES OF DIFFERENTLY BONDED PAPERS

| Identification of Bonded Paper | Break Strength (g./in.) | | | Water Climb Rate (sec./in.) |
|---|---|---|---|---|
| | Dry | 6% NaOH Wet | Wet | |
| Acid Regenerated Viscose: | | | | |
| MD | 5,787 | 253 | 1,299 | 12.6 |
| TD | 4,671 | 240 | 1,337 | 12.2 |
| Non-Acid Regenerated Viscose:[1] | | | | |
| MD | 6,030 | 59 | 1,169 | 7.8 |
| TD | 5,130 | 59 | 1,064 | 9.4 |
| Melamine Formaldehyde Resin, 2.5%: | | | | |
| MD | 2,277 | 283 | 418 | 25.2 |
| TD | 2,124 | 293 | 446 | 19.5 |
| Melamine Formaldehyde Resin, 3.0%: | | | | |
| MD | 2,286 | 322 | 501 | 26.5 |
| TD | 2,340 | 338 | 492 | 18.4 |
| Melamine Formaldehyde Resin, 1.0% and Non-Acid Regenerated Viscose:[1] | | | | |
| MD | 5,018 | 292 | 1,103 | 5.2 |
| TD | 4,376 | 254 | 967 | 5.5 |

[1] After 21 days storage.

As can be seen from the data set forth in Table N above, the paper bonded with the combination of melamine formaldehyde resin and viscose exhibits a decided improvement in 6% NaOH Wet Break Strength as compared with the paper bonded only with viscose and not acid regenerated. This bonded paper also compares favorably in the same test with the paper bonded with acid regenerated viscose and with the melamine formaldehyde resin bonded papers having a resin content of 2.5% and 3.0%. The data in Table N also reveals that the water climb rate of the papers bonded with viscose and not acid regenerated, both with and without melamine formaldehyde resin, is significantly improved as compared to the water climb rate exhibited by the papers bonded with acid regenerated viscose or only with melamine formaldehyde resin. This improvement in absorbtivity of the papers bonded with viscose and not acid regenerated, either in combination with or without melamine formaldehyde resin, compensates for any interference with this property by the melamine formaldehyde resin when it is utilized.

It should be understood that, while the examples set forth hereinabove disclose specific embodiments regarding the resin content employed in the webs, the resin content of the webs can be varied within operable limits without adversely affecting the web strength required for casing manufacture and still retain the porosity characteristic of the fibrous web which is necessary for proper viscose penetration in producing fibrous food casings. Webs having a resin content of between about 0.5% to 4.0% by weight can be employed satisfactorily. Through the practice of the present invention, it will become apparent to those skilled in the art that the concentration of resin employed in treating the fibrous webs can be varied depending upon such factors as the particular casing process environment, the relative strength of the machine and transverse direction of the web and the like.

Although the present invention has been described and set forth in some detail, it should be further understood that the same is susceptible of changes, modifications and variations without departing from the scope and spirit of the invention.

What is claimed is:

1. A tubular regenerated cellulosic casing for dry sausage which casing is characterized by adherence to a dry sausage product encased, processed and dried therein for a prolonged period of time during which processing and drying shrinkage of said encased product occurs, which casing is provided with a coating comprising a cationic thermosetting resin bonded to the inside wall thereof, said resin being present in an amount of at least about 0.015% by weight based on the weight of said dried casing and not more than an amount which would adversely affect the moisture vapor transmission and elasticity of said casing, such that said amount of said resin is effective to impart adherence of said casing to said sausage product encased therein despite shrinkage of said product.

2. The casing of claim 1 wherein a fibrous web is embedded in said regenerated cellulose casing.

3. The coating of claim 1 wherein the cationic thermosetting resin is selected from the group of resins consisting of the reaction products of an epichlorohydrin and a polyamide, a modified melamine and formaldehyde, and modified urea and formaldehyde.

4. A method for producing a tubular regenerated cellulosic casing for dry sausages which casing is characterized by adherence to a dry sausage product encased, processed and dried therein for a prolonged period of time during which processing and drying shrinkage of said encased product occurs, which method includes the steps of
  (a) contacting the inside wall of a tubular, regenerated cellulosic casing, after said casing has been glycerinated, with a coating composition comprising a cationic thermosetting resin, said cationic thermosetting resin being present in said composition in an amount sufficient to be present in said sausage weight based on the weight of said casing after said casing has been dried and not more than an amount which would adversely affect the moisture vapor transmission and elasticity of said casing; and,
  (b) bonding the cationic thermosetting resin of said coating composition to the inside wall of said casing by subjecting the thusly contacted casing to heat until said cationic thermosetting resin is cured.

5. The method of claim 4 wherein the cationic thermosetting resin is selected from the group of resins consisting of the reaction products of an epichlorohydrin and a polyamide, a modified melamine and formaldehyde, and a modified urea and formaldehyde.

6. The method of claim 4 wherein a fibrous web is embedded in said tubular regenerated cellulosic casing.

7. A fibrous web employed as a substrate in the manufacture of fibrous food casings, said fibrous web being characterized by being bonded with a cationic thermosetting resin in an amount of at least about 0.5% by weight based upon the dry weight of said bonded fibrous web, which amount is effective to provide the necessary strength to said fibrous web for food casing manufacture without interfering with the porosity characteristic and the viscose penetration of the thusly bonded fibrous web.

8. The fibrous web of claim 7 wherein the cationic thermosetting resin is present in said fibrous web in an amount of between about 0.5% to 4.0% by weight based upon the dry weight of said bonded fibrous web.

9. The fibrous web of claim 7 wherein the cationic thermosetting resin is selected from the group consisting of the reaction products of an epichlorohydrin and a polyamide, a modified melamine and formaldehyde and modified urea and formaldehyde.

10. The fibrous web of claim 9 wherein the thermosetting resin is polyamide-epichlorohydrin.

11. A tubular, cellulosic food casing having a fibrous web embedded therein, said fibrous web being characterized by being bonded with a cationic thermosetting resin in an amount of at least about 0.5% by weight based upon the dry weight of said bonded fibrous web, which amount is effective to provide the necessary strength to said fibrous web during manufacture of said food casing without interfering with the porosity characteristic and the viscose penetration of the thusly bonded fibrous web.

12. The food casing of claim 11 wherein the cationic thermosetting resin is present in said fibrous web in an amount of between about 0.5% to 4.0% by weight based upon the dry weight of said bonded fibrous web.

13. The food casing of claim 12 wherein the cationic thermosetting resin is selected from the group consisting of the reaction products of an epichlorohydrin and a polyamide, a modified melamine and formaldehyde, and modified urea and formaldehyde.

14. The food casing of claim 13 wherein the thermosetting resin is polyamide-epichlorohydrin.

15. A method for producing a tubular, cellulosic food casing having a fibrous web embedded therein comprising the steps of:
  (a) impregnating a fibrous web with a cationic thermosetting resin in an amount of at least about 0.5% by weight based upon the dry weight of said impregnated fibrous web, which amount is effective to provide the necessary strength to said fibrous web for the manufacture of fibrous food casings without interfering with the porosity characteristic and the viscose penetration of said fibrous web;
  (b) heating the thusly impregnated fibrous web until said cationic thermosetting resin is cured; and,
  (c) forming a tubular cellulosic food casing having said fibrous web embedded therein by coating said fibrous web with viscose and regenerating the viscose in said food casing.

16. The method of claim 15 wherein said cationic thermosetting resin is selected from the group consisting of the reaction products of an epichlorohydrin and a polyamide, a modified melamine and formaldehyde and modified urea and formaldehyde.

17. The method of claim 15 wherein the cured thermosetting resin is present in said fibrous web in an amount of between about 0.5% to 4.0% by weight based upon the dry weight of said impregnated fibrous web.

18. The method of claim 15 wherein the fibrous web is impregnated with said thermosetting resin by adding said thermosetting resin to the fibrous slurry prior to forming said fibrous web.

19. The method of claim 15 wherein the fibrous web is impregnated with said thermosetting resin by passing said fibrous web through an aqueous solution which contains said thermosetting resin in an amount sufficient to be present in said fibrous web in an amount of between about 0.5% to 4.0% by weight when said fibrous web is cured.

20. The method of claim 16 wherein the thermosetting resin is polyamide epichlorohydrin.

21. The method of claim 18 wherein the thermosetting resin impregnated in the fibrous web is first cured in the fibrous web and the fibrous web is then further bonded by treatment with non-acid regenerated viscose and then dried.

22. The method of claim 21 wherein the thusly formed web is stored for a period sufficient to permit autoregeneration of the viscose to occur such that the strength of the thusly formed web increases.

References Cited

UNITED STATES PATENTS

| | | | |
|---|---|---|---|
| 2,181,329 | 11/1939 | Hewitt | 99—176 X |
| 2,657,132 | 10/1953 | Daniel et al. | 162—167 |
| 2,686,725 | 8/1954 | Cornwell | 99—176 |
| 2,711,961 | 6/1955 | Bruner | 162—167 |
| 2,826,500 | 3/1958 | Keim | 162—167 |
| 2,986,489 | 5/1961 | Maxwell | 162—166 |
| 3,135,613 | 6/1964 | Underwood | 99—176 |
| 3,239,491 | 3/1966 | Tsou et al. | 162—168 X |

HYMAN LORD, *Primary Examiner.*